United States Patent
Lovas et al.

(10) Patent No.: US 9,667,184 B2
(45) Date of Patent: May 30, 2017

(54) DEVICE FOR DETERMINING A POSITION OF A ROTOR OF A POLYPHASE ELECTRIC MOTOR

(71) Applicants: Ivan Lovas, Prievidza (SK); Pavel Grasblum, Frenstat Pod Radhostem (CZ); Libor Prokop, Brno (CZ)

(72) Inventors: Ivan Lovas, Prievidza (SK); Pavel Grasblum, Frenstat Pod Radhostem (CZ); Libor Prokop, Brno (CZ)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/758,981

(22) PCT Filed: Jan. 9, 2013

(86) PCT No.: PCT/IB2013/050198
§ 371 (c)(1),
(2) Date: Jul. 2, 2015

(87) PCT Pub. No.: WO2014/108746
PCT Pub. Date: Jul. 17, 2014

(65) Prior Publication Data
US 2015/0340980 A1 Nov. 26, 2015

(51) Int. Cl.
*H02P 6/18* (2016.01)
(52) U.S. Cl.
CPC .............. *H02P 6/183* (2013.01); *H02P 6/186* (2013.01)
(58) Field of Classification Search
CPC ............. H02P 6/18; H02P 6/183; H02P 6/186
USPC .................. 318/400.33, 400.32, 400.01, 700
See application file for complete search history.

(56) References Cited

U.S. PATENT DOCUMENTS

| 5,001,405 A | 3/1991 | Cassat |
| 5,254,914 A | 10/1993 | Dunfield |
| 6,194,861 B1 | 2/2001 | Bang |
| 6,555,977 B1 | 4/2003 | Du et al. |

(Continued)

FOREIGN PATENT DOCUMENTS

| CN | 1420620 A | 5/2003 |
| JP | 09331695 | 12/1997 |
| KR | 100338010 | 5/2002 |

OTHER PUBLICATIONS

International Search Report and Written Opinion correlating to PCT/IB2013/050198 issued on Oct. 11, 2013.

(Continued)

*Primary Examiner* — Kawing Chan

(57) ABSTRACT

A device for determining a rotor position in a polyphase electric motor having a first phase, a second phase and a third phase. A power control unit applies a first voltage on the first phase, and a second voltage on the second phase, the first voltage and the second voltage being periodic signals of opposite polarity, alternating between a first part and a second part of the alternating period, such as square waves. A sample unit samples a third voltage on the third phase for acquiring a first sample at a first instant in the first part and a second sample at a second instant in the second part, and a difference value between the first sample and the second sample. The difference value represents a mutual inductance between the stator coils due to the rotor position. A determination unit determines the rotor position based on the difference value.

17 Claims, 6 Drawing Sheets

(56) References Cited

U.S. PATENT DOCUMENTS

| | | | |
|---|---|---|---|
| 6,650,082 | B1 | 11/2003 | Du |
| 7,095,204 | B2 | 8/2006 | Lee et al. |
| 7,190,131 | B2 | 3/2007 | Oh |
| 7,202,623 | B2 | 4/2007 | Zhou et al. |
| 7,429,840 | B2 | 9/2008 | Pollock et al. |
| 2002/0030462 | A1 | 3/2002 | Matsushiro et al. |
| 2005/0218848 | A1 | 10/2005 | Zhou et al. |
| 2006/0132075 | A1 | 6/2006 | Lee et al. |
| 2009/0026991 | A1 | 1/2009 | Boscolo Berto |
| 2010/0026223 | A1* | 2/2010 | Liu .................. H02P 21/32 318/400.33 |
| 2010/0141192 | A1 | 6/2010 | Paintz et al. |
| 2010/0283414 | A1* | 11/2010 | Jun .................. D06F 37/304 318/400.02 |
| 2011/0227519 | A1 | 9/2011 | Horng et al. |
| 2012/0146626 | A1 | 6/2012 | Bieler et al. |

OTHER PUBLICATIONS

Initial Rotor Position Estimation of an Interior Permanent-Magnet Synchronous Machine Using Carrier-Frequency Injection Methods, by Yu-Seok Jeong, Robert D. Lorenz, Thomas M. Jahns, and Seung-Ki Sul, as published in IEEE Transactions on Industry Applications, vol. 41, No. 1, Jan./Feb. 2005.
European Search Report mailed Dec. 21, 2016 for corresponding EP 13870912.6, 8 pages.

* cited by examiner

DEVICE FOR DETERMINING A POSITION OF A ROTOR OF A POLYPHASE ELECTRIC MOTOR

FIELD OF THE INVENTION

This invention relates to a method and a device for controlling a polyphase electric motor, such as a brushless direct current motor, from standstill condition and at low speeds, by instantaneously determining an orientation and/or a speed of a rotor with respect to a stator of the motor. In the field, several techniques are known that allow control based on speed detection using an additional electric device such as an external electrically powered sensor which is in connection with a controller of the motor.

BACKGROUND OF THE INVENTION

Electric motors comprise a rotor and a stator having a plurality of wound field coils. Nowadays, brushless DC motors are advantageously implemented in applications of middle and high speed ranges. Brushless DC motors may be of a type of variable reluctance, or a permanent magnet, or a combination thereof. Variable reluctance brushless motors have an iron core rotor that follows or chases sequentially shifting magnetic fields of the stator coils to facilitate rotational motion of the rotor. Permanent magnet brushless motors have the sequentially energized field coils that attract or repel a permanent magnet rotor to facilitate rotational motion of the rotor.

Multiple phase motors typically comprise a permanent magnet rotor and three electrical windings. The three electrical windings are related to the three phases of the motor. Three phase currents flow through the motor windings, typically at a 120 electrical degree phase relationship with respect to one another. The phase currents create a rotating electro-magnetic field which causes angular motion of the permanent magnet rotor.

The control of a brushless DC motor is arranged to apply the power to the motor phases by energizing and de-energizing the individual phase windings. This method is well known as commutation. In order to drive the rotor in a direction from startup and to maintain a desired rotational speed and torque at steady state, a commutation sequence or scheme is applied according to the current rotor position. By this measure, the proper phase windings are energized at appropriate times causing mutual attracting and/or repelling of the phase windings and the rotor magnetic poles, causing the desired angular motion of the permanent magnet rotor.

For a proper rotational movement of the rotor, the control of a brushless DC motor requires information of the position of the rotor with respect to the stator windings. By knowing this position, the control may energize the stator windings in the appropriate sequence to apply a revolving magnetic field in the motor to generate the required rotational torque on the rotor. For detecting the rotor position, it is well known to use measurement data gathered by an external electrically powered speed transducer and/of a speed sensor to sense the position of the rotor with respect of the stator windings.

The use of such transducers and/or sensors is costly because it relates to an increased number of parts with respect to the motor apparatus per se. The increased number of parts contributes to a lower reliability of the motor control since there is a chance to fail under some conditions. Moreover, these additional parts require a valuable space within the motor housing. Since decades it has been the purpose to minimize space consumed by the motor structure and to improve the cost efficiency. In order to make the external electrically powered speed transducer and/or the speed sensor superfluous, several attempts have been made to obtain commutation position feedback without the use of transducers and/or sensors.

For measuring the position and/or speed of the rotor with respect of the stator, a digital, sensorless back-EMF (Electric Motive Force) control technique is common use. This technique is based on back-EMF voltage measurement, is reliable and requires a relatively simple implementation comprising a relatively small additional part being a circuit. In multiple phase motors having a permanent magnet rotor and three electrical windings a, b, and c, the corresponding back emf components are assumed to be a function of rotor position, motor winding current, and rotor speed. This technique is implemented in several applications for operating a brushless direct current motor control at middle and high speed ranges. The back-EMF technique may be used from 5-10% of nominal speed of the brushless DC motor.

In standstill condition and at low speed operation however, the back-EMF voltage amplitude is very low or zero, and thus the position of the rotor is immeasurable. U.S. Pat. No. 6,555,977 describes an apparatus and method for determining the position of the rotor at low speed and even zero speed by deriving a value of the mutual inductance disposed between a first and a second phase by voltage measurement of a floating phase, or unconnected phase, or, as described herein, a third phase, since the voltage of the floating phase is a function of the rotor position due to the mutual inductance components. The patent proposes, however, a voltage measurement of the third phase by using zero crossing and/or detecting a polarity change in the measured mutual inductance, followed by filtering out low frequency components caused by the back-EMF component, followed by rectifying the signal, and followed by filtering out high frequency components caused by a high frequency excitation component.

SUMMARY OF THE INVENTION

The present invention provides a as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
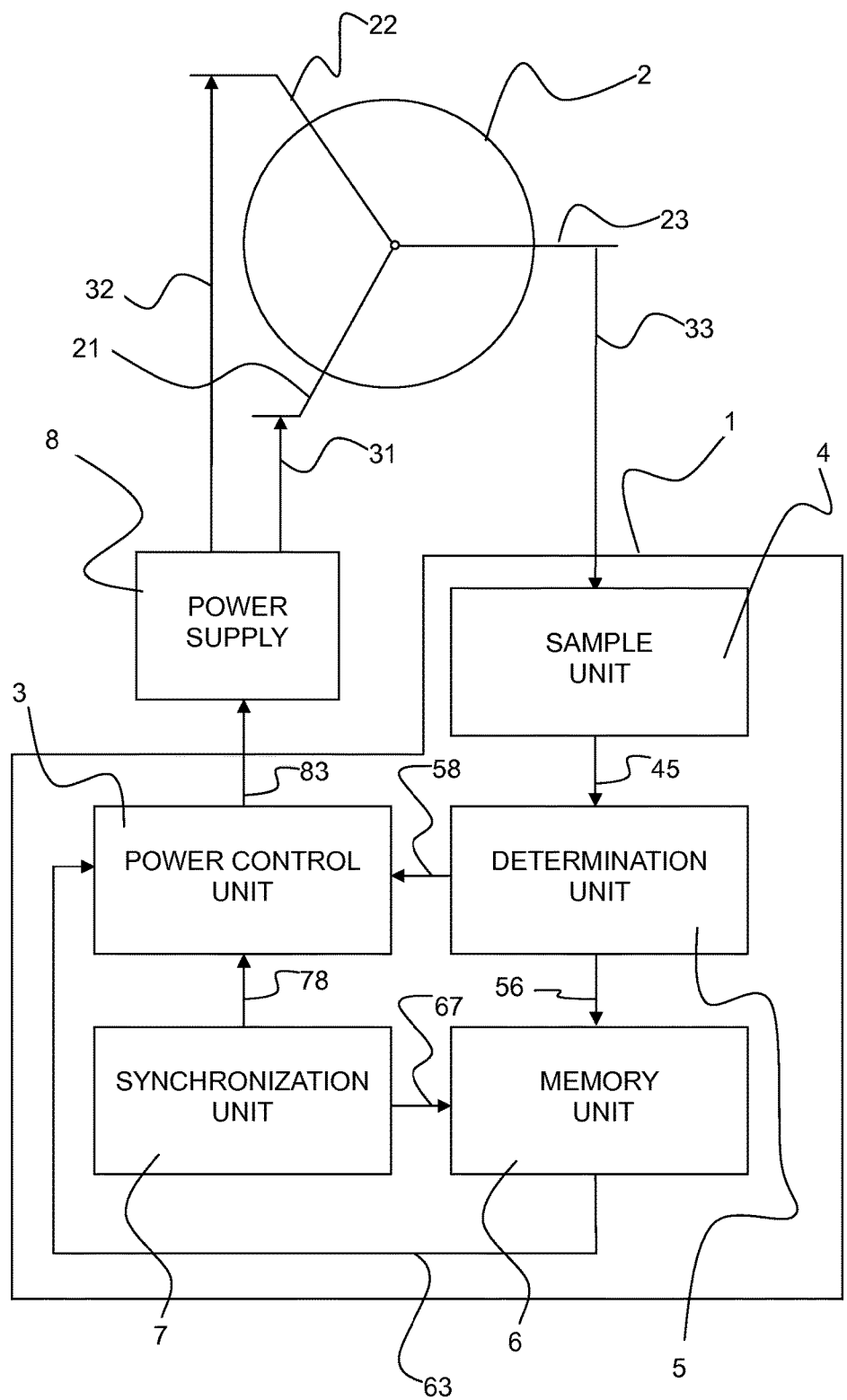
FIG. 1 schematically shows an example of an embodiment of a device, comprising a power control unit, a sampling unit, and a determination unit for determining a rotor position.
Figure 2:
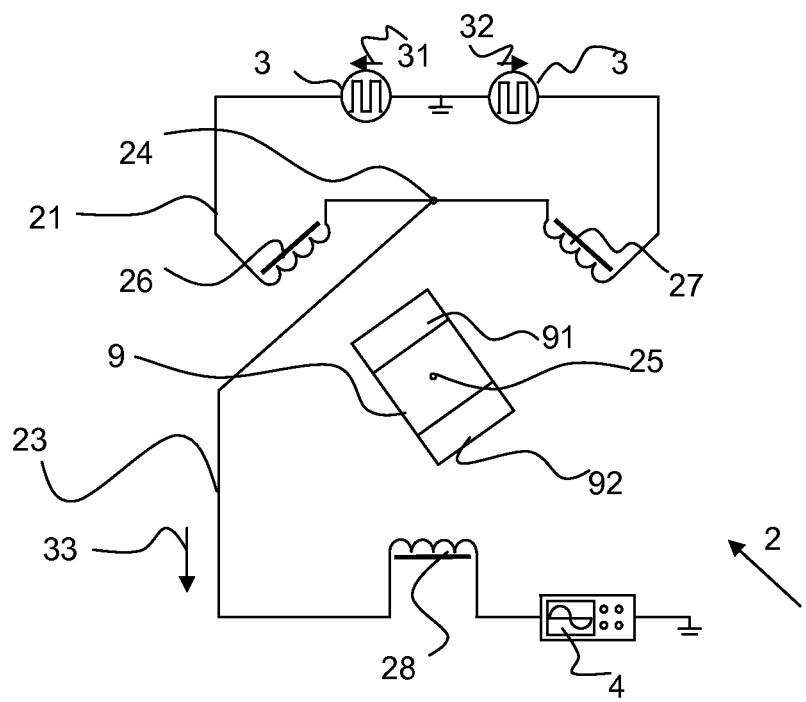
FIG. 2 schematically shows an example of an embodiment of an electric motor comprising a first phase, a second phase, and a third phase of a polyphase electric motor, having a rotor and a stator, the rotor having a first position with respect to a stator.
Figure 3:
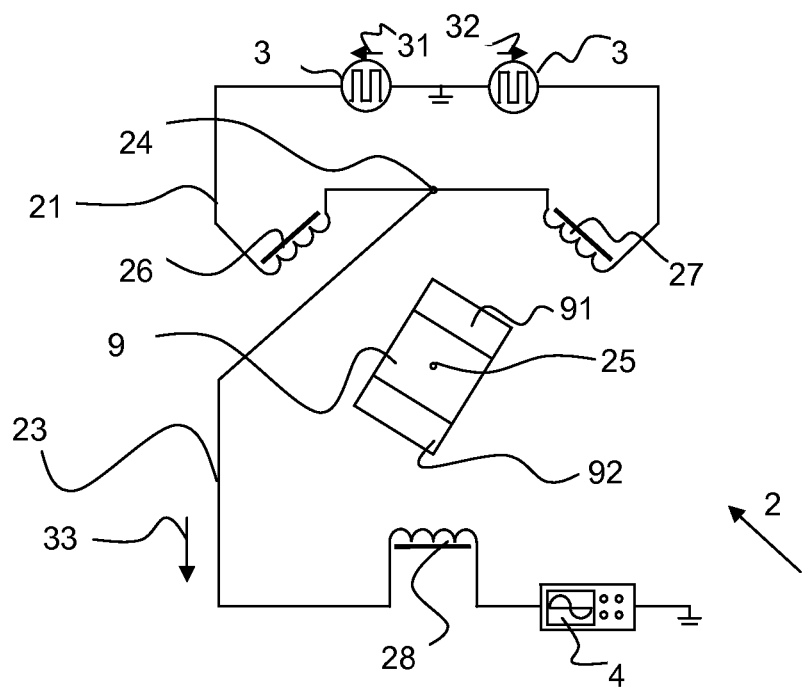
FIG. 3 schematically shows an example of an embodiment according to FIG. 2, the rotor having a second position with respect to a stator.

The present invention will now be described with respect to the accompanying drawings in which like numbered elements represent like parts. The invention is directed to a device 1, shown in FIG. 1, and method 100, shown in FIG. 9, for sensorless detection of a rotor position in a polyphase electric motor 2, such as a brushless direct current motor 2, having a permanent magnet, as shown in FIGS. 2 and 3.

The device 1 comprises a power control unit 3, a sample unit 4, and a determination unit 5. FIG. 1 shows such a device 1, including a memory unit 6, and a synchronization unit 7, which will be described hereinafter. FIG. 2 shows the electric motor 2 having stator coils 26, 27, 28 and comprising a first phase 21, a second phase 22 and a third phase 23. The device 1 is arranged to determine the position of the rotor 9, or rather, the rotor position, for example at zero speed and/or at least low speed of the rotor 9.

The rotor 9 of the electric motor 2 comprises, in this example, a permanent magnet having a north pole 91 and a south pole 92. The rotor 9 is able to rotate around a virtual centreline 25 which is transversely oriented on the paper of the drawing. The rotor 9 is arranged to rotate with respect to the stator housing wherein the coils 26, 27, 28 are mounted. FIG. 2 shows a situation wherein the north pole 91 of the rotor 9 is facing the coil 26 that is connected in the first phase 21. FIG. 3 shows a further situation wherein the north pole 91 of the rotor 9 is facing the coil 27 that is connected in the second phase 22.

It is noted that system for the determination of the rotor position may be similarly applied to a polyphse motor having more than three coil sections, which repetitively generate first second and third phase magnetic stator fields, and a corresponding rotor having multiple poles.

Determining of the rotor position is based on the electric property of mutual inductance between the windings of the electric motor 2, since the mutual inductance varies as a function of the rotor position. The mutual inductance components of the motor 2 vary with a rotor position changes due to the reluctance variation as the rotor position changes. The mutual inductance in the situation according to FIG. 2 is thus different from the mutual inductance in the further situation according to FIG. 3.

The mutual inductance can be detected by applying a first voltage 31 on the first phase 21, and a second voltage 32 on the second phase 22 by means of the power control unit 3. The mutual inductance can be analysed by sampling a third voltage 33 on the third phase 23 by means of the sample unit 4, in order to obtain a value representing a mutual inductance between the stator coils 26, 27, 28 due to the rotor position.

Figure 4:
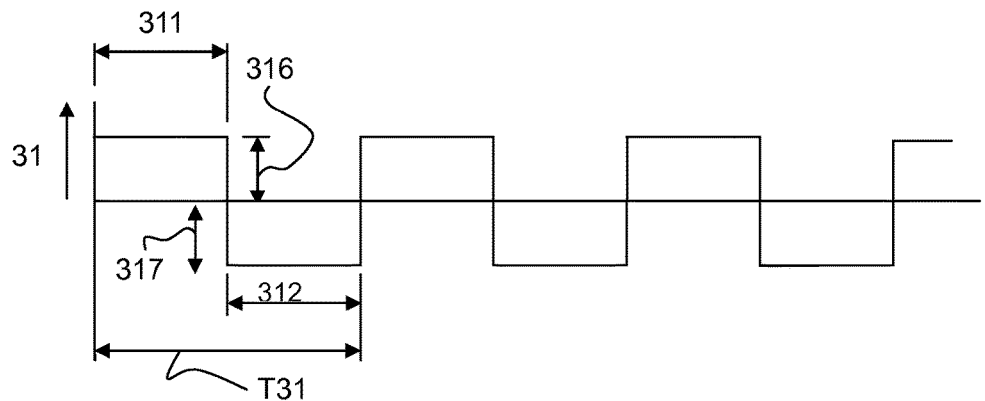
FIG. 4 is an electrical signal of a first voltage on the first phase of the electric motor.

FIG. 4 shows the first voltage 31 alternating between a first part 311 of an alternating period T31 and a second part 312 of the alternating period T31.

Figure 5:
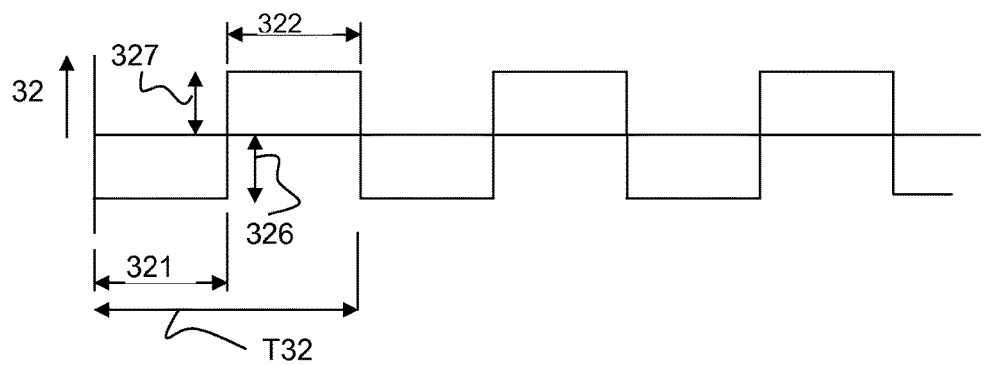
FIG. 5 is an electrical signal of a second voltage on the second phase of the electric motor.

FIG. 5 shows the second voltage 32 alternating between a first part 321 of an alternating period T32 and a second part 322 of the alternating period T32. The first and second voltages 31, 32 in first part 311, 321 and the second part 312, 322 having opposite polarity and the first voltage 31 and the second voltage 32 having opposite polarity.

The device 1 is arranged to apply the first voltage 31 such that the first voltage 31 in the first part 311 has a first amplitude 316 and the first voltage 31 in the second part 312 has a second amplitude 317, and the first amplitude 316 being equal to the second amplitude 317. Similarly, the device 1 is arranged to apply the second voltage 32 such that the second voltage 32 in the first part 321 has a further first amplitude 326 and the second voltage 32 in the second part 322 has a further second amplitude 327, and the further first amplitude 326 being equal to the further second amplitude 327. In this example, the first and the second voltage 31, 32 both have a square wave form at a predetermined duty cycle. For performing a measurement while the motor remains stationary, i.e. without the first and second voltages causing a torque, the duty cycle is 50%. For performing a measurement while the motor is rotating, i.e. the first and second voltages causing a torque, the duty cycle of the square wave is different from 50%.

It is noted that the first and second voltage may have other periodic waveforms, e.g. a sine wave. Also, the first part may have a waveform differing from the second part, provided the total current generated in the coils during the first part equals the current generated in the second part having an opposite polarity, so as not to generate a resulting average current which would exert a torque on the rotor. Hence, to avoid a magnetic field in the motor exerting a torque on the rotor, a total current invoked by the first voltage during the first part is the same, but opposite to a total current invoked by the first voltage during the second part. The third voltage and the difference voltage between said samples will correspond to the waveforms used.

For driving purposes of the electric motor, the first and the second voltage 31, 32 are pulse width modulated and commutated between successive phases to cause a revolving magnetic field in the motor 2 exerting a torque on the rotor 9. In order to avoid a magnetic field in the motor 2 exerting a torque on the rotor 9, a voltage time area of the first part 311, 321 is the same as a voltage time area of the second part 312, 322.

Determination of the mutual inductance requires measuring the third voltage 33 on the third phase 23, which third phase 23 is also known as a floating phase, and/or an unconnected phase of the polyphase electric motor. The third voltage 33 is a function of the rotor position due to the mutual inductance components.

Figure 6:
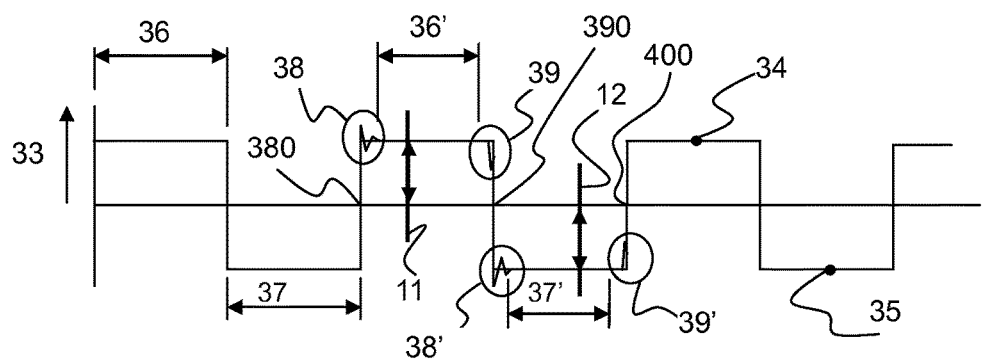
FIG. 6 is an electrical signal of an third voltage on the third phase which corresponds to a mutual inductance when the rotor is in the first position.

FIG. 6 shows the third voltage 33 on the third phase 23 which corresponds to a mutual inductance when the rotor is in a first position according to FIG. 2. To gather the third voltage 33 appropriately, the sample unit 4 is arranged for sampling the third voltage 33, as shown in FIG. 6, on the third phase 23 for acquiring a first sample 11 at a first instant in the first part 36, 36' and a second sample 12 at a second instant in the second part 37, 37'.

The determination unit 5 has an input to receive a sample unit output signal 45 for processing the first and second samples 11, 12 required for determining the mutual inductance and the rotor position based on the difference value.

The determination unit 5 has circuitry for determining the difference value between the samples which samples represent a mutual inductance between the stator coils 26, 27, 28 due to the rotor position. For example, when the rotor is in a position symmetrical with respect to the coils of phase 1 and phase 2, and when the periodic first and second voltages on phase 1 and phase 2 are equal but of opposite polarity, or, in other words, having a phase difference of 180 degrees, the contribution of the first voltage via the mutual inductance is equal but opposite to the contribution of the second voltage via the mutual inductance. By taking the difference value between said first and second sample, Based on the first and second samples 11, 12 sampled by the sample unit 4, the device 1 of FIG. 1 is adapted for determining a difference value between the first sample 11 and the second sample 12 representing a difference of the mutual inductance between both the first and second stator coils and the third, floating coil, due to the rotor position. Since determining of the difference value between the first sample 11 and the second sample 12 implies a subtraction of a voltage value 35 according to the second sample 12 from a further voltage value 34 according to the first sample 11, any influence of a low frequency components and noise is filtered out. Any low frequency being present within the voltage value 34 is having the same influence as the low frequency being present within the further voltage value 35. As a result, the low frequency noise being present in both samples is filtered out by said subtraction.

In order to avoid inaccurate measurement of the third voltage 33 due to high frequency components or noise 38, 39, 38', 39', for example near zero crossing 380, 390 of the third voltage 33, sampling near zero crossings 380, 390 needs to be avoided. Therefore, the sampling unit 4 of the device 1 takes the first sample 11 in between subsequent zero crossings 380, 390 of the first part 36 of the third voltage 33, and takes the second sample 12 in between further subsequent zero crossings 390, 400 of the second part 37 of the third voltage 33. In other words, the first sample 11 is taken in a first interval 36' of the first part 36 of the third voltage 33, in which first interval 36' the high frequency noise is absent, and the second sample 12 is taken in a second interval 37' of the second part 37 of the third voltage 33, in which second interval 37' the high frequency noise is absent as well.

The measurement according to this sampling system results in an accurate determination of the difference value, and hence enables accurate determination of mutual inductance. As an example, the first sample 11 can be taken at halfway 34 the first part 36 of the third voltage 33, and halfway 35 the second part 37 of the third voltage 33. The second sample 12 of the third voltage 33 is, in this example, taken a half period later than the first sample 11.

Figure 7:
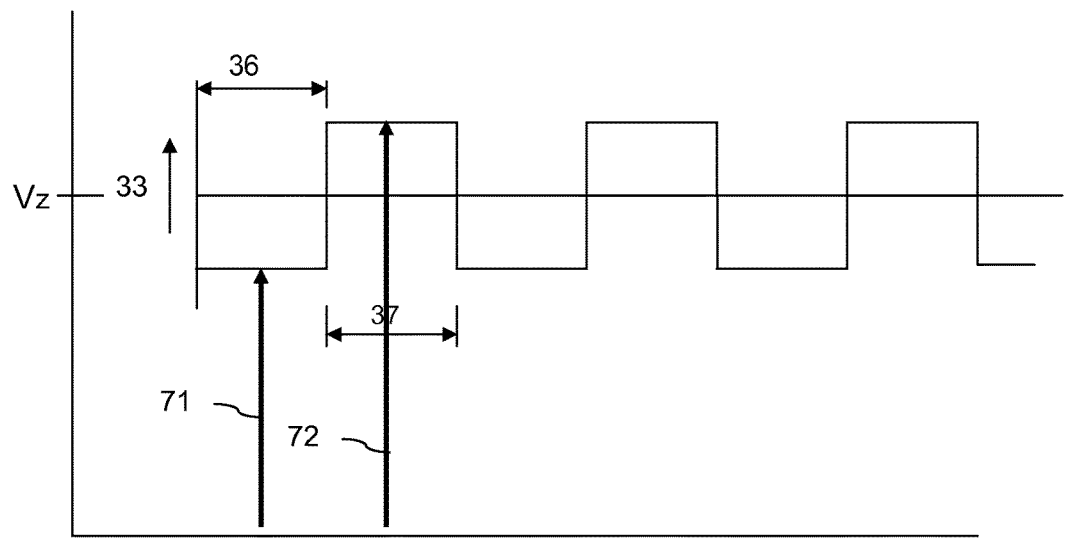
FIG. 7 is an electrical signal of an third voltage on the third phase which corresponds to a mutual inductance when the rotor is in the second position.

FIG. 7 shows the third voltage 33 on the third phase 23 which corresponds to a mutual inductance when the rotor is in a second position according to FIG. 3. Furthermore, FIG. 7 shows a first sample 71 and a second sample 72 which are determined with respect to a supply ground level, while the actual voltage 33 is shown to be around a zero level Vz.

It is noted that FIG. 7 shows that the voltages on the phases may be defined with respect to a zero level Vz. Likewise, the first and second excitation voltages on the first and second phase may be defined with reference to the zero level. The zero level may for example be 50% of a DC supply voltage that drives the device 1. It is noted that, in this document, voltages and polarities are defined with respect to such a zero level. The supply source may alternatively provide both a positive and a negative supply voltage, so that the supply ground level corresponds to said zero level.

In practice an analog-to-digital converter (ADC) may be used to measure the samples. The reference for the measurement may be the supply ground level. Amplitude of measured voltages is then around 50% of the supply voltage Vdcb, i.e. Vz=Vdcb/2. Both samples, called Sample71 and Sample72, are positive values. Hence the reference of the samples is ground level, and the difference value DIF is: DIF=Sample71−Sample72. When the values of the samples are determined with reference to said zero level as shown in FIG. 6, called Sample11 and Sample12, the difference value DIF is: DIF=Sample11+Sample12. In both cases the value DIF changes polarity, synchronous with the first and second driving voltages on the other phases.

Figure 8:
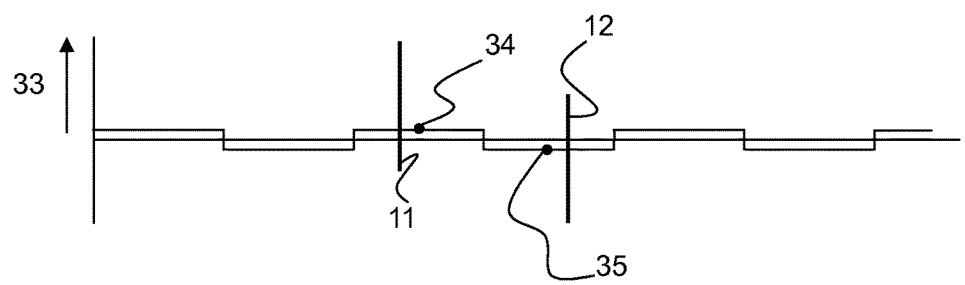
FIG. 8 is an electrical signal of an third voltage on the third phase which corresponds to a mutual inductance when the rotor is a position between the first position of FIG. 6 and the second position of FIG. 7.

FIG. 8 shows the third voltage 33 on the third phase 23 which corresponds to a mutual inductance when the rotor is in an intermediate position between the first and the second position according to FIGS. 3 and 4 respectively. In this intermediate position, the north pole 91 of the rotor 9 is facing between the coils 26, 27 that are connected in the first and second phase 21, 22 respectively.

In order to determine the rotor position while rotating, in the device 1 of FIG. 1 the determination unit 5 may be arranged for determining a variation in the difference value between the first sample 11 and the second sample 12 representing the rotor rotation based on the variation of the difference value. It is known in the art that the angle of the rotor with respect to the stator can be calculated based on the mutual inductance. The rotation may be derived based on said variation. Examples of relations between angle and mutual inductance can be found in U.S. Pat. No. 6,555,977.

For deriving the angle from the difference voltage the determination unit 5 is provided with a calculation unit for calculating the rotor position based on the detected difference value which represents the mutual inductance substantially in a linear way. Alternatively or additionally actual measurements may be performed to determine the relation between the difference voltage and the angle of the rotor. Based on the measurements a function may be fitted, and may be used in the calculation unit.

Alternatively, the rotor position can be determined by using a look-up table, in which table data is stored for the rotor angular position for specific difference voltage values. For a respective rotor position, the mutual inductance and the first and the second voltages 31, 32, determine the actual difference value, and so the rotor position can be calculated using these pre-determined values, e.g. by interpolation.

The device 1 is provided with a power control unit 3 for controlling 83 power to be supplied by the power supply 8 to the first and the second phases 21, 22. For controlling 83 the power supply 8, the power control unit 3 needs information about the position of the rotor 9. Therefore, the power control unit 8 is adapted to receive first determination unit output signals 58 of the rotor position based on the determined difference values. Alternatively the power control unit may directly provide the power signals to the respective phases, while an external power supply is coupled to supply connections of the device 1.

The device 1 is, in this example, provided with a memory unit 6 for registering a value corresponding to the rotor position and/or for maintaining the rotor position value while the rotor 9 is not rotating. Therefore, the memory unit 6 is adapted to receive second determination unit output signal 56 of the rotor position based on the determined difference values.

It is noted, that at some instants, the rotor position may be unknown, for example immediately after power up, when the memory contents are invalid, or after a period without measurements and analysis of the difference value. Moreover, although the above mentioned system may detect a rotor position, it cannot resolve the symmetry of the rotor. In the 3 coil stator and single north/south pole rotor, this symmetry results in substantially the same difference value each 180 degrees of rotation. To resolve this uncertainty, an initial position of the rotor must be determined, which is also called synchronisation.

For example, synchronisation may be based on detecting a difference in a maximum value of the difference signal when the rotor north or south pole is aligned with the first or second stator coil. A relatively small difference in the maximum signal value may be detected between the north pole and the south pole signal.

The device 1 may be provided with a synchronization unit 7 for determining an initial position of the rotor. Therefore, the synchronization unit 7 is adapted to provide a memory unit output signal 67 of the rotor position initially determined by said synchronization. In order maintain this information is stored in the memory unit 6. For performing the synchronization as described below, a synchronization unit output signal 78 may be sent to the power control unit 3 for powering respective coils of the stator.

A way to synchronize the rotor 2, for example for the case that the power has been switched off and there is no reference of the orientation of the rotor 2 possible, comprises a system wherein the electric motor 2 is powered by predetermined voltage in order to position the rotor 9 with respect to the stator in such a way that the rotor 9 will be rotated to a reference position, in which position, for example, the north pole 91 is facing a nearest coil mounted in the stator. Thereto said stator coil may be powered by a continuous signal of a predetermined polarity, or the pulse width modulated signals may be adjusted to that effect, for rotating the rotor. From the moment the rotor 9 arrives in said position, the rotor position is known and store in the memory unit.

For example, alignment may be done by normal PWM signals, by generating a magnetic field of one direction for a few milliseconds. After this time rotor is oriented according this magnetic field. There are two possibilities how to done alignment. Using all 3 phase or only 2 phases:

1. 3-Phase Alignment—for example 70% of duty cycle on phase A and B and 30% of duty cycle on phase C, will rotate the north pole to phase C 2. 2-Phase Alignment—for example 70% of duty cycle only on phase A and 30% of duty cycle on phase C; will rotate the north pole between B and C.

A further way of synchronizing is by determining the initial position of the rotor as described in the document "Initial Rotor Position Estimation of an Interior Permanent-Magnet Synchronous Machine Using Carrier-Frequency Injection Methods", by YU-SEOK JEONG, ROBERT D. LORENZ, THOMAS M. JAHNS, AND SEUNG-KI SUL, as published in IEEE TRANSACTIONS ON INDUSTRY APPLICATIONS, VOL. 41, NO. 1, JANUARY/FEBRUARY 2005. In the document a system is described for detecting an initially unknown position of a rotor by using high frequency voltages on at least one winding and detecting the response.

Figure 9:
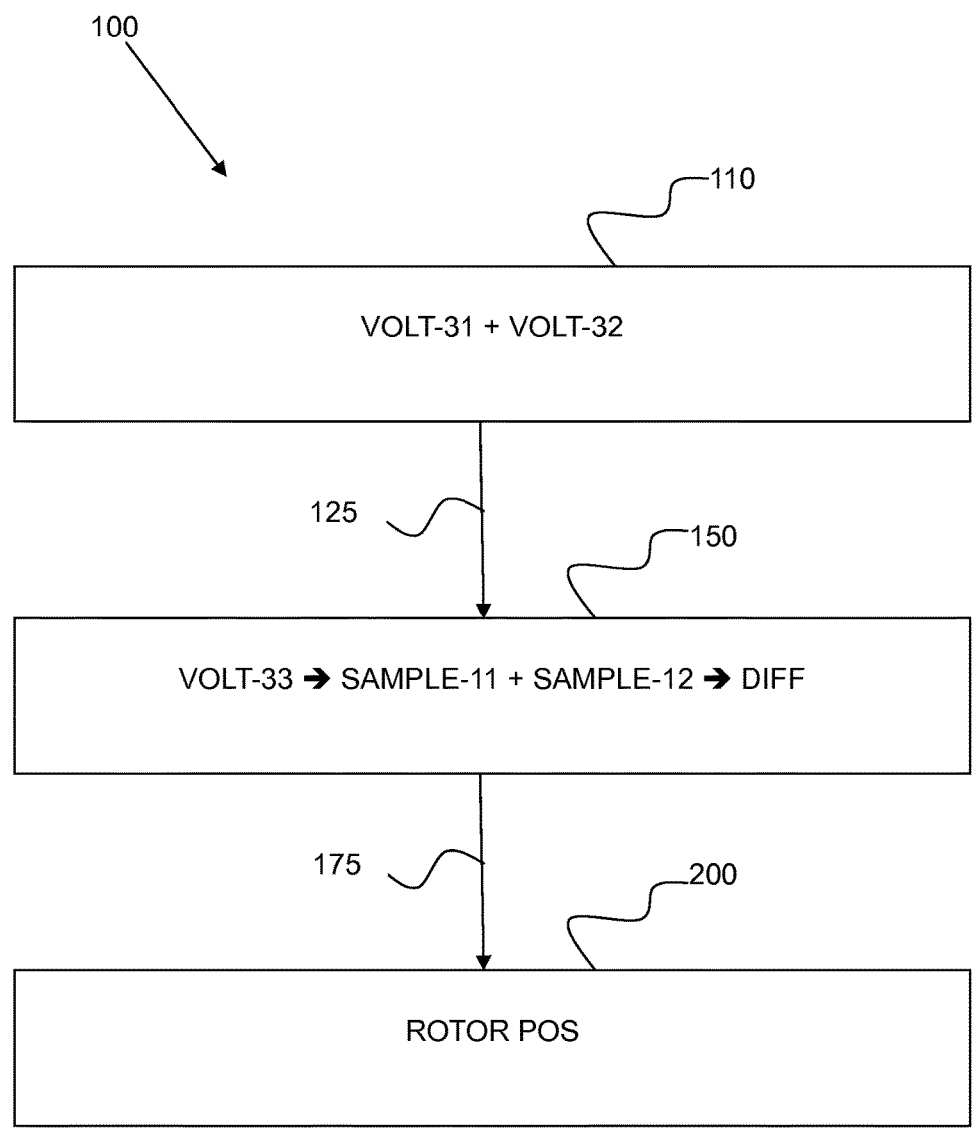
FIG. 9 schematically shows an example of an embodiment of a method according to the invention, comprising applying of a first voltage and a second voltage, sampling of a third voltage, and determining the rotor position based on the third voltage.

FIG. 9 shows a method 100 of determining a rotor position. The figure shows a flow for determining a rotor position in a polyphase electric motor 2 having stator coils comprising a first phase 21, a second phase 22 and a third phase 23. The method has a first step VOLT-31+VOLT-32 of applying 110 a first voltage 31 on the first phase 21, and a second voltage 32 on the second phase 22. As described above, the first voltage 31 and the second voltage 32 are both alternating between a first part 311, 321 of an alternating period T31, T32 and a second part 312, 322 of the alternating period T31, T32, and the voltages 31, 32 in the first part 311, 321 and the second part 312, 322 having opposite polarity and the first voltage 31 and the second voltage 32 having opposite polarity. While applying said voltages, as indicated by arrow 125, in step SAMPLING 150 a third voltage 31, in FIG. 9 referred to as "volt-33", on the third phase 23 is sampled for acquiring a first sample 11, in FIG. 9 referred to as "sample-11", at a first instant in the first part 36 and a second sample 12, in FIG. 9 referred to as "sample-12", at a second instant in the second part 37. Subsequently, a difference value DIFF is determined between the first sample 11 and the second sample 12 representing a mutual inductance between the stator coils due to the rotor position. The process continues, as indicated by arrow 175, by a step 200 ROTOR POS, which determines the rotor position based on the difference value.

Figure 10:
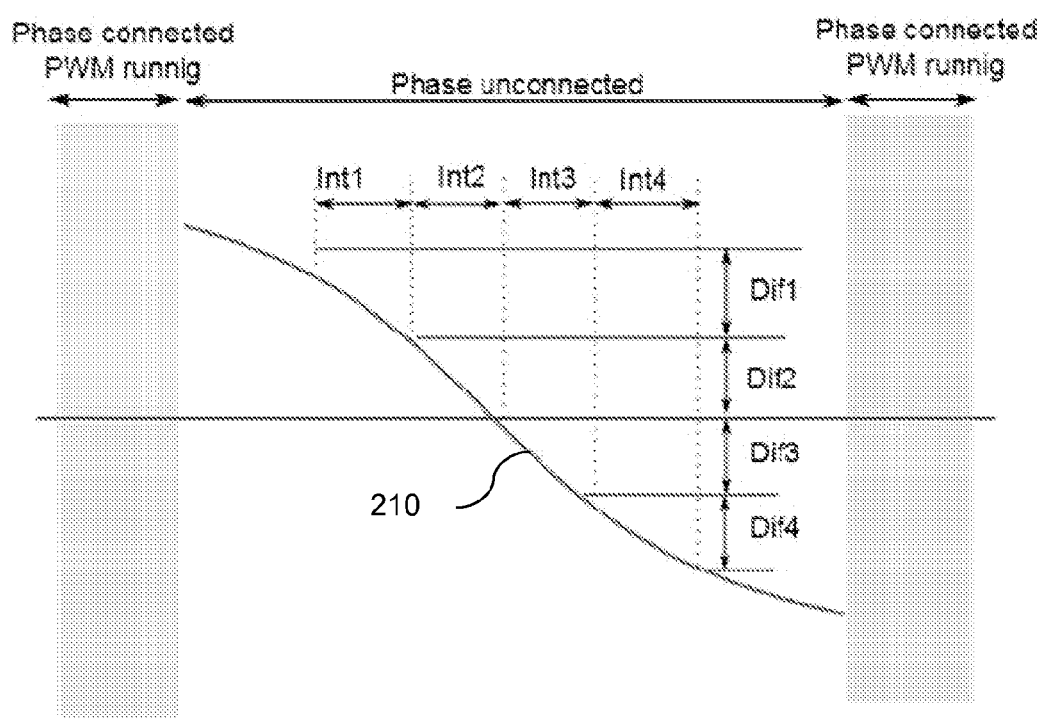
FIG. 10 illustrates, in graph form, a voltage during various time periods.

FIG. 10 shows measuring speed using the mutual inductances. In a graph a voltage 210 on an unconnected phase is shown during a time period that the phase is unconnected while the motor is rotating. Both before and after this period said phase is connected to a driving voltage according to the well known commutation and using pulse width modulation (indicated by Phase connected PWM running). A set of four consecutive measurements of the difference vale, called Dif1, Dif2, Dif3 and Dif4, are shown to represent the difference value during four consecutive time periods Int1, Int2, Int3 and Int4. The position of the rotor can be determined at each of said time periods, and as the speed of change of the rotor position is now known, the rotation can be accurately calculated.

The measurement of speed using the mutual inductances enables accurate and fast detection of the rotation speed. Basically the speed may be determined by taking at least two measurements of the rotor position by applying any of the methods as described above.

Moreover, in a commonly used 6-step control, which measures speed based on full rotation of the rotor only, there is relatively long time between speed measurement points (6 times per revolution). During low speed it is very important to measure speed as often as possible. By using a number of the above difference measurements it is possible to observe voltage changes within part of a single rotation, and accordingly compute the speed.

In practice a number of voltage differences (dif1, dif2, dif3, dif4 . . . ) are measured for consecutive time intervals (int1, int2, int3, int4 . . . ), and the speed is computed from these changes. Preferably the time intervals have the same length (int1=int2=int3=int4= . . . ). The accuracy may be improved by taking into account nonlinearity of the motor in practice, which may be compensated, for example by using calibration and a look-up table.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Also, the invention is not limited to physical devices or units implemented in non-programmable hardware but can also be applied in programmable devices, such as a FPGA (Field Programmable Gate Array) or units able to perform the desired device functions by operating in accordance with suitable program code, e.g. so-called firmware. The FPGA is an integrated circuit designed to be configured by a customer or a designer after manufacturing, so-called "field-programmable". The FPGA configuration is generally specified using a hardware description language (HDL). Furthermore, the device may be physically distributed over a number of apparatuses, while functionally operating as a single device.

Furthermore, the units and circuits may be suitably combined in one or more semiconductor devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A device comprising:
   a power control unit configured to apply a first voltage on a first phase, and a second voltage on a second phase, wherein
      the first voltage and the second voltage both alternate between a first part of an alternating period and a second part of the alternating period,
      the voltages, with respect to a zero level, in the first part and the second part have opposite polarity, and
      the first voltage and the second voltage have opposite polarity;
   a sample unit configured to
      sample a third voltage on the third phase to acquire a first sample at a first instant in the first part and a second sample at a second instant in the second part, and
      determine a difference value between the first sample and the second sample which represents a mutual inductance between stator coils due to the rotor position; and
   a determination unit configured to determine a rotor position based on the difference value;
   wherein the first sample is taken at a first midpoint of a first time interval between two successive zero crossings of the third voltage, and the second sample is taken at a second midpoint of a second time interval between two later in time successive zero crossings of the third voltage,
   wherein the power control unit further to provide power to the stator coils to control the motor based the determined rotor position.

2. The device according to claim 1, wherein the first voltage in the first part has a first amplitude and the first voltage in the second part has a second amplitude, and the first amplitude is equal to the second amplitude.

3. The device according to claim 1, wherein the first and the second voltage have a square wave form at a predetermined duty cycle.

4. The device according to claim 3, wherein the predetermined duty cycle is a 50% duty cycle.

5. The device according to claim 1, wherein the determination unit is arranged for determining a speed of rotation by determining a multitude of consecutive rotor positions within a period of the third phase being not driven by a pulse width modulated drive voltage.

6. The device according to claim 1, comprising a memory unit adapted to register a position value of the rotor for maintaining the rotor position value while the rotor is not rotating.

7. The device according to claim 1, wherein, to avoid a magnetic field in the motor exerting a torque on the rotor, a total current invoked by the first voltage during the first part is the same, but opposite to a total current invoked by the first voltage during the second part.

8. The device according to claim 1, wherein the first and the second voltage are pulse width modulated and commutated between successive phases to cause a revolving magnetic field in the motor exerting a torque on the rotor.

9. The device according to claim 1, comprising a synchronization unit for determining an initial position of the rotor.

10. The device of claim 9, wherein the synchronization unit is arranged for setting the rotor in a pre-determined position with respect to the stator by applying a pre-determined input voltage on at least one of the coils, so as to rotate the rotor to the pre-determined position.

11. A method for determining a rotor position in a three-phase polyphase electric motor having stator coils, the method comprising:
   applying a first voltage on the first phase, and a second voltage on the second phase, the first voltage and the second voltage both alternating between a first part of an alternating period and a second part of the alternating period, and the voltages, with respect to a zero level, in the first part and the second part having opposite polarity and the first voltage and the second voltage having opposite polarity;

sampling a third voltage on the third phase for acquiring a first sample at a first instant in the first part and a second sample at a second instant in the second part, and for determining a difference value between the first sample and the second sample representing a mutual inductance between the stator coils due to the rotor position;

determining the rotor position based on the difference value; wherein the first sample is taken at a first midpoint of a first time interval between two successive zero crossings of the third voltage, and the second sample is taken at a second midpoint of a second time interval between two later in time successive zero crossings of the third voltage; and providing power to the stator coils to control the motor based on the determined rotor position.

12. The method according to claim 11, wherein the first voltage in the first part has a first amplitude and the first voltage in the second part has a second amplitude, the first amplitude being equal to the second amplitude, the first and the second voltage have a square wave form at a predetermined duty cycle, the predetermined duty cycle is a 50% duty cycle.

13. The method according to claim 11, wherein the second sample of the third voltage is taken a half period later than the first sample.

14. The method according to claim 11, comprising registering a position value of the rotor for maintaining the rotor position value while the rotor is not rotating.

15. The method according to claim 11, wherein, to avoid a magnetic field in the motor exerting a torque on the rotor, a total current invoked by the first voltage during the first part is the same, but opposite to a total current invoked by the first voltage during the second part.

16. The method according to claim 11, wherein the first and the second voltage are pulse width modulated and commutated between successive phases to cause a revolving magnetic field in the motor exerting a torque on the rotor.

17. The method according to claim 11, comprising synchronizing by determining an initial position of the rotor.

* * * * *